United States Patent [19]

Takubo et al.

[11] Patent Number: 4,543,926
[45] Date of Patent: Oct. 1, 1985

[54] EXHAUST PORT STRUCTURE FOR ROTARY PISTON ENGINES

[75] Inventors: Hiroichi Takubo; Hiroshi Sasaki, both of Hiroshima, Japan

[73] Assignee: Mazda Motor Corporation, Hiroshima, Japan

[21] Appl. No.: 601,175

[22] Filed: Apr. 17, 1984

[30] Foreign Application Priority Data

Apr. 19, 1983 [JP] Japan .................................. 58-69376

[51] Int. Cl.$^4$ .......................... F02B 53/04; F01C 1/22
[52] U.S. Cl. .................................. 123/242; 418/61 A
[58] Field of Search .................. 123/203, 242, 243; 418/15, 61 A

[56] References Cited

U.S. PATENT DOCUMENTS 3,448,727  6/1969  Kobayakawa ................. 418/61 A
3,483,850 12/1969  Yamamoto et al. ............ 418/61 A
4,237,848 12/1980  Korzhov et al. ............... 123/242

FOREIGN PATENT DOCUMENTS 41-12241 7/1966  Japan .
56-85525 7/1981  Japan .................................. 123/242

Primary Examiner—John J. Vrablik
Attorney, Agent, or Firm—Fleit, Jacobson, Cohn & Price

[57] ABSTRACT

A rotary piston engine having an exhaust port device in the rotor housing. The exhaust port device includes a single exhaust port formed in the rotor housing and an insert located in the exhaust port. The insert has a hollow body and partition walls separating the trailing part of the port opening into three sub-parts. The central one of the sub-parts is covered by a cover wall so that the port area is gradually increased to suppress exhaust noise. The insert can be rapidly brought into a high temperature during engine start so that the exhaust gas purifying system can rapidly be activated.

10 Claims, 5 Drawing Figures

EXHAUST PORT STRUCTURE FOR ROTARY PISTON ENGINES

The present invention relates to rotary piston engines and more particularly to exhaust port means for rotary piston engines. More specifically, the present invention pertains to exhaust port means for rotary piston engines provided on rotor housings.

Conventional rotary piston engines include a casing comprised of a rotor housing having an inner wall of trochoidal configuration and a pair of side housings gas-tightly secured to the opposite sides of the rotor housing to define a rotor cavity therein. A substantially polygonal rotor is disposed in the rotor cavity with apex portions in sliding engagement with the inner wall of the rotor housing thus defining working chambers of variable volume between the inner wall of the rotor housing and flank portions of the rotor. The casing is provided with one or more intake ports for introducing a charge of intake gas to one of the working chambers in intake stroke. Further, the casing is also formed with an exhaust port for exhaust combustion gas from the working chamber in exhaust stroke.

Conventionally, the exhaust port is formed in the rotor housing so as to be opened when the leading apex portion passes through the port. The exhaust port is usually constituted by a single port opening of a substantially rectangular configuration so that the port area increases abruptly as the leading apex position passes the trailing side edge of the port opening. Therefore, there will be produced a rush of exhaust gas flow to the exhaust port causing a sudden expansion and turbulence of the exhaust gas which result in substantial exhaust noise. In order to solve the above problem, it has been proposed and put into practice to form the exhaust port by three circular port openings arranged in a triangular pattern one being at the trailing side and the other two at the leading side. This arrangement is effective to suppress the exhaust noise to a certain degree, however, it has a serious problem that the exhaust flow resistance is significantly increased due to an insufficient port area.

In view of the above problem, the U.S. Pat. No. 3,448,727 proposes to divide the exhaust port into three port openings including a trailing side opening, an intermediate opening and a leading side opening arranged in the direction of rotor rotation so as to open successively in this order. The trailing side opening has a substantially arcuate configuration at the trailing side edge so that the port area is gradually increased to thereby prevent an abrupt expansion of the exhaust gas. Although this arrangement is effective to suppress abrupt expansion of the exhaust gas to some extent, it is not effective to prevent turbulence so that the exhaust noise cannot satisfactorily be suppressed.

It should further be noted that, in the conventional exhaust port arrangements, a substantial part of the heat in the exhasut gas is absorbed by the casing material during a cold engine start and a light load operation. Therefore, there will be a substantial decrease in the exhaust gas temperature which will result in an increase in noxious emissions.

It is therefore an object of the present invention to provide an exhaust port structure for rotary piston engines which is effective to suppress exhaust noise.

Another object of the present invention is to provide an exhaust port structure for rotary piston engines which is effective to prevent abrupt expansion and turbulence of the exhaust gas.

A further object of the present invention is to provide an exhaust port structure in which the exhaust gas temperature can be maintained in cold engine starts and light load engine operations to thereby suppress noxious emissions in the exhaust gas.

According to the present invention, the above and other objects can be accomplished by a rotary piston engine including a casing comprised of a rotor housing having an inner wall of a trochoidal configuration and a pair of side housings gas-tightly secured to the opposite sides of the rotor housing to form a rotor cavity therein, a substantially polygonal rotor disposed in said casing with apex portions in sliding contact with the inner wall of the rotor housing to define working chambers of which volumes cyclically change to conduct intake, compression, expansion and exhaust strokes as the rotor rotates, intake port means provided in said casing to open to the working chamber in the intake stroke, exhaust port means provided in the rotor housing and including a single exhaust port which is opened to the working chamber in the exhaust stroke through a port opening formed in the inner wall of the rotor housing, said port opening having a width in the axial direction of the rotor housing and a length in the peripheral direction of the rotor housing, said exhaust port having a depth from said port opening in substantially the radial direction of the rotor housing, insert means in said exhaust port, said insert means having wall means located close to the inner wall of the rotor housing for covering a part of the width of the port opening at a trailing part of the port opening having at least one early opening region of a relatively narrow width in the trailing part, partition means extending in the peripheral direction of the rotor housing from the wall means and the depthwise direction of the exhaust port for at least partially separating the early opening region from the remaining region.

In a preferable aspect of the present invention, the wall means includes a cover wall located to cover an intermediate portion of the width of the port opening at the trailing part leaving early opening regions at the opposite sides of the cover wall. Where the port opening has rounded corners, the arrangement is effective to gradually increase the port area since the widths of the early opening regions will be gradually increased due to the rounded corners. The partition means may include first partition wall means extending in the peripheral direction of the rotor housing from the cover wall and continuous to second partition wall means extending in the axial direction of the rotor housing.

Preferably, the insert means is made of a material of low thermal capacity, such as an iron based material, so that it can readily be brought to a high temperature in a cold engine start. Thus, it becomes possible to maintain the exhaust gas temeprature. It is preferable that the insert means has a peripheral wall which is adapted to be located with a clearance from the wall surface of the exhaust port. The second partition wall may then have an end which is separated or spaced apart from the peripheral wall for the purpose of preventing a crack which may possibly be produced in the insert means due to thermal shock.

The above and other objects and features of the present invention will become apparent from the following descriptions of preferred embodiments taking reference to the accompanying drawings, in which.

Figure 1:
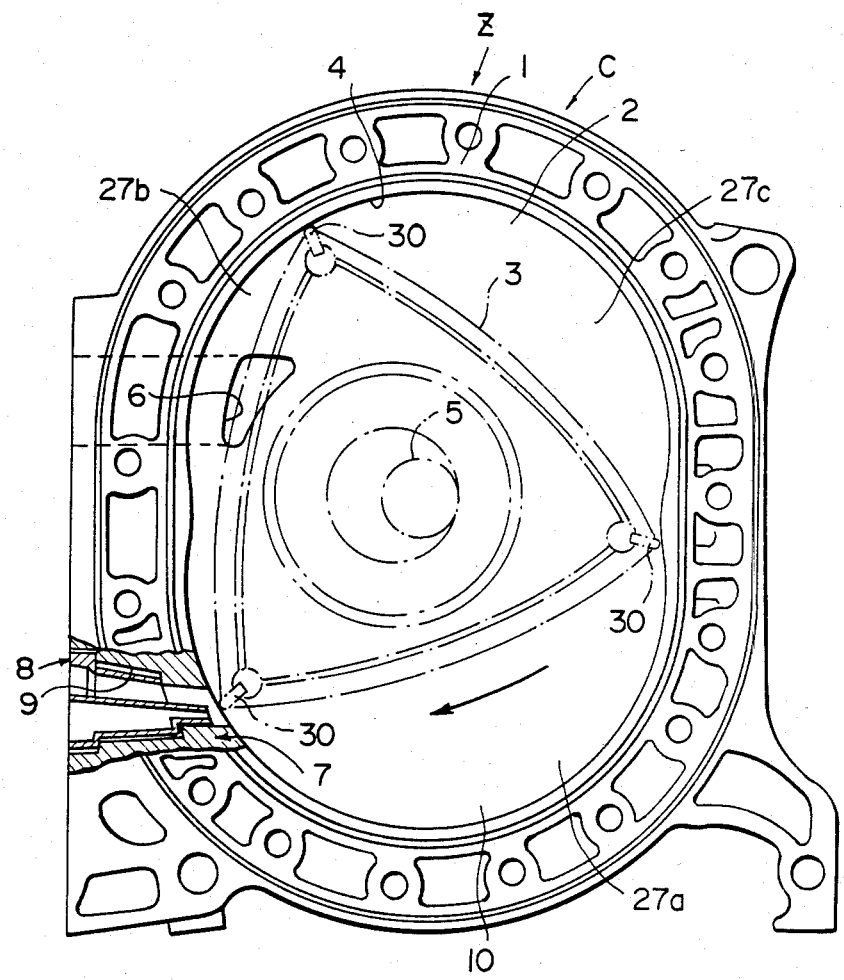
FIG. 1 is a cross-sectional view of a rotary piston engine in accordance with one embodiment of the present invention.

Referring to the drawings, particularly to FIG. 1, there is shown a rotary piston engine Z including a casing c comprised of a rotor housing 1 having an inner wall 4 of a trochoidal configuration and a pair of side housings 2 secured gas-tightly to the opposite sides of the rotor housing 1 to define a rotor cavity 10. In the rotor cavity 10, there is disposed a rotor 3 of substantially triangular configuration which has apex portions provided with apex seals 30 for sliding engagement with the inner wall 4 of the rotor housing 1. There are therefore defined three working chambers 27a, 27b and 27c by the inner wall 4 of the rotor housing 1 and flanks of the rotor 3. The rotor 3 is carried by an eccentric shaft 5 and rotated in the direction shown by an arrow in FIG. 1. As the rotor rotates, the volumes of the working chambers cyclically change to conduct intake, compression, combustion, expansion and exhaust strokes. In FIG. 1, the working chamber 27a is shown in the end of the expansion stroke and in the beginning of the exhaust stroke. The working chamber 27b is in the intake stroke and the working chamber 27c is in the compression stroke.

The side housing 2 is formed with an intake port 6 that opens to the working chamber 27b in the intake stroke for introducing a combustible mixture to the working chamber. The rotor housing 1 is provided with an exhaust port structure 7 for exhausting the combustion gas from the working chamber 27a in the exhaust stroke.

Figure 2:
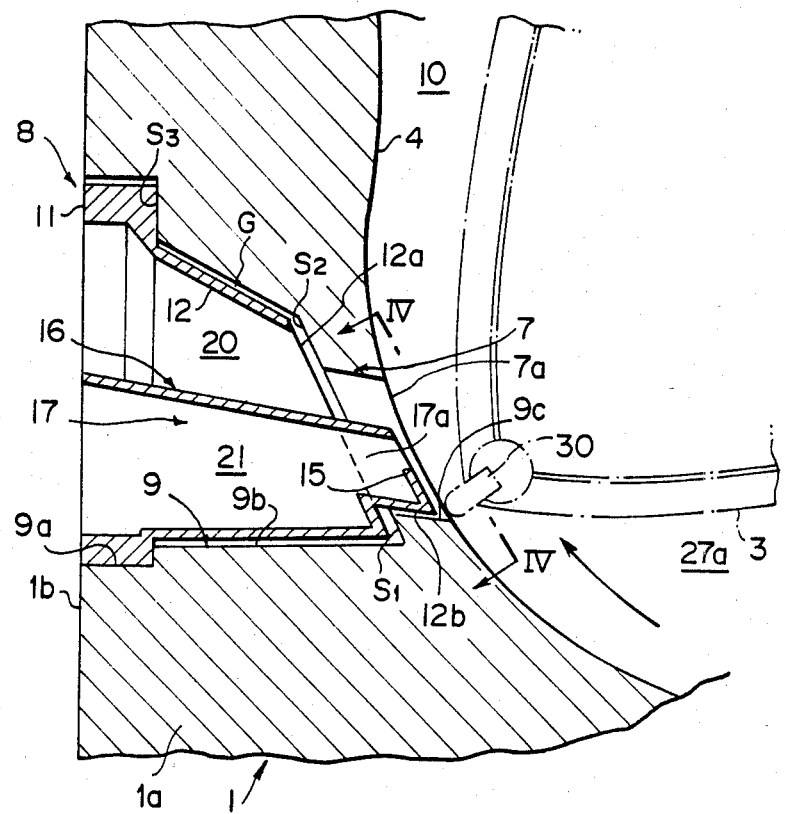
FIG. 2 is a fragmentary sectional view showing the exhaust port structure in the rotary piston engine shown in FIG. 1.
Figure 4:
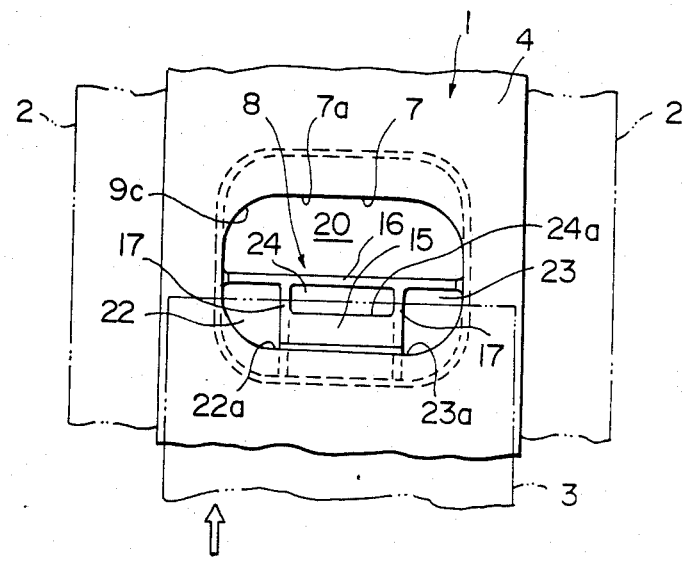
FIG. 4 is a view of the exhaust port as seen in the direction of IV—IV in FIG. 2.

As shown in FIG. 2, the exhaust port structure 7 includes a single exhaust port 9 formed in the rotor housing 1 to open to the rotor cavity through a port opening 7a and extending through the thickness of the rotor housing 1. The exhaust port 9 is constituted by a counter-bore section 9a, and intermediate tapered section 9b extending radially inwards from the counterbore section 9a, and a port section 9c closest to the inner wall 4. As shown in FIG. 4, the port opening 7a is of a substantially rectangular configuration having rounded corners. The port section 9c of the exhaust port 9 has substantially the same configuration as the port opening 7a. The tapered section 9b is of a cross-section at the radially inward end, which has a width as measured in the axial direction of the rotor housing 1 slightly larger than that of the port opening 7a, and a length as measured in the peripheral direction of the rotor housing 1 which is larger than the length of the port opening 7a to provide steps $S_1$ and $S_2$ both at the trailing and leading sides. The length of the cross-section of the tapered section 9b is gradually increased in the radially outward direction by expanding the section gradually from the leading side. The counterbore section 9a is of a cross-section of which both the width and length are larger than the corresponding dimension at the radially outward end of the tapered section 9b to provide a circumferential stepped shoulder $S_3$.

Figure 3:
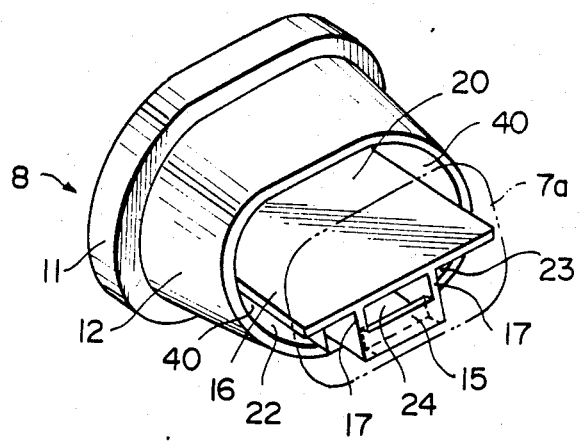
FIG. 3 is a perspective view of the port insert used in the exhaust port structure.

An insert 8 is inserted into the exhaust port 9 as clearly shown in FIG. 2. Referring to FIG. 3, it will be noted that the insert 8 has an end flange 11 adapted to be seated on the stepped shoulder $S_3$ between the counterbore section 9a and the tapered section 9b. A tapered hollow body 12 is formed to extend from the end flange 11. The tapered hollow body 12 has a tapered configuration substantially the same as the configuration of the tapered section 9b in the port 9 but slightly smaller in cross-section than the tapered section 9b. Thus, the tapered hollow body 12 is located in the tapered section 9b of the port 9 with a clearance G between the body 12 and the section 9b.

In the tapered hollow body 12, there is a side-wise partition wall 16 which extends in the widthwise direction of the insert 8 for separating the inside of the insert 8 into a leading part 20 and a trailing part 21. In the trailing part 21, the insert 8 is further formed with a pair of parallel, spaced lengthwise partition walls 17 separating the trailing part 21 into three sub-parts 22, 23 and 24. The sub-part 24 is formed between the walls 17 whereas the sub-parts 22 and 23 are formed at the opposite sides of the sub-part 24. The partition walls 16 and 17 extend from the outer end of the flange 11 through the tapered hollow portion 12 and further beyond the inner end 12a of the hollow portion 12 into the port section 9c of the exhaust port 9. The partition walls 16 and 17 then terminate at the radially inner ends close to the inner wall 4 of the rotor housing 1. The hollow portion 12 is extended at the trailing side to close the space between the partition walls 17 in the port section 9c as shown by 12b in FIG. 2 and, at the inner end, the insert 8 has a cover wall 15 which covers the trailing half of the sub-part 24. Thus, the sub-part 24 has a trailing side edge 24a which is offset toward leading side from trailing side edges 22a and 23a of the sub-parts 22 and 23 by a distance corresponding to the length of cover wall 15 as measured in the peripheral direction of the rotor housing 1. As shown in detail in FIGS. 3 and 4, there are provided clearances 40 between the opposite side edges of the partition wall 16 and the tapered hollow portion 12.

In operation, the apex seal 30 on the rotor 3 slidably moves along the inner wall 4 of the rotor housing 1 from the trailing side to the leading side. As the apex seal 30 passes the trailing side edge of the port opening 7a, the sub-parts 22 and 23 of the trailing part 21 are opened to the trailing side working chamber 27a to start the exhaust stroke of that working chamber 27a. Since the sub-parts 22 and 23 are formed at the rounded corners of the port opening 7a, the port area is gradually opened preventing abrupt expansion of the combustion gas. Further, because the sub-parts 22 and 23 are separated by the partition walls 17, it is possible to suppress turbulence of the exhaust gas. As the apex seal 30 proceeds further to the leading side, the sub-part 24 starts to open to thereby increase the port area further. Since the sub-part 24 is separated from the sub-parts 22 and 23, it is possible to suppress turbulence of the exhaust gas flow. In this manner, it is possible to suppress the exhaust noise to a satisfactory extent. Then, the leading part 20 of the port opening 7a is opened when the apex seal 30 passes the trailing part 21 to further increase the port area.

In the structure described above, the widthwise partition wall 16 may not be necessary, provided that the lengthwise partition walls 17 separate the sub-parts for a certain period from the start of the exhaust stroke. The trailing part 21 of the port opening 7a may not necessarily be divided into three sub-parts as shown, but it may be divided into two sub-parts by only one lengthwise partition wall, one of such sub-parts being partially covered by the cover wall. The insert 8 may be made of a material having a small thermal capacity. The insert 8 can readily be brought into a high temperature even in a cold engine start so that it is possible to maintain the exhaust gas temperature in the engine warming-up period. It is therefore possible to bring the exhaust gas purifying system into an active condition at an early stage. The clearance G between the tapered hollow portion 12 of the insert 8 and the tapered section 9b of the port 9 provide a thermal insulation which contributes to bringing the insert 8 to a high temperature at an early stage of the engine warming-up period. The flange 11 of the insert 8 seated on the stepped shoulder $S_3$ prevents the exhaust gas from flowing through the clearance G. The clearances 40 provided between the widthwise partition wall 16 and the tapered hollow portion 12 of the insert 8 are effective to prevent cracks which may possibly be produced in the insert 8 due to thermal shock.

Figure 5:
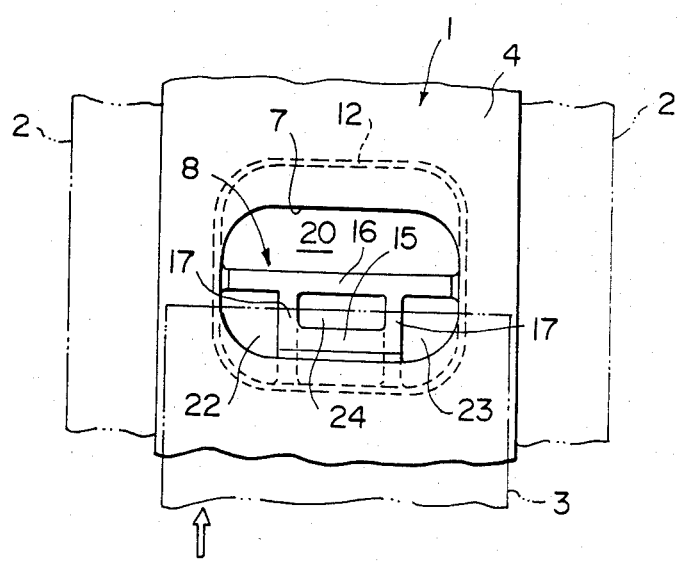
FIG. 5 is a view similar to FIG. 4 but showing another embodiment.

Referring to FIG. 5, there is shown another embodiment of the present invention which is substantially identical to the previous embodiment so that corresponding parts are designated by the same reference numerals as in the previous embodiment. In this embodiment, the only difference from the previous embodiment is that the partition walls 16 and 17 are thicker than the tapered hollow portion 12. The thicker wall thicknesses in the partition walls 16 and 17 are effective to prevent resonance vibrations of these partition walls to thereby suppress the noise caused by such vibration. Further, the thinner wall thickness of the tapered hollow portion 12 provides the insert with resiliency which serves to absorb pulsation energies in the exhaust gas.

The invention has thus been shown and described with reference to specific embodiments, however, it should be noted that the invention is in no way limited to the details of the illustrated structures but changes and modifications may be made without deparating from the scope of the appended claims.

We claim:

1. A rotary piston engine including a casing comprised of a rotor housing having an inner wall of a trochoidal configuration and a pair of side housings gastightly secured to the opposite sides of the rotor housing to form a rotor cavity therein, a substantially polygonal rotor disposed in said casing with apex portions in sliding contact with the inner wall of the rotor housing to define working chambers of which the volumes cyclically change to conduct intake, compression, expansion and exhaust strokes as the rotor rotates, intake port means provided in said casing to open to the working chamber in the intake stroke, exhaust port means provided in the rotor housing and including a single exhaust port which is opened to the working chamber in the exhaust stroke through a port opening formed in the inner wall of the rotor housing, said port opening having a width in the axial direction of the rotor housing and a length in the peripheral direction of the rotor housing, said exhaust port having a depth extending from said port opening in an outward direction relative to the rotor housing inner wall, insert means comprising a hollow body located in said exhaust port, said hollow body having wall means located close to the inner wall of the rotor housing for covering a part of the width of the port opening at a trailing part of the port opening leaving at least one early opening region of a relatively narrow width in the trailing part, partition means extending in the peripheral direction of the rotor housing from the wall means and in the depthwise direction of the exhaust port for at least partially separating the early opening region from the remaining region.

2. A rotary piston engine in accordance with claim 1 in which said wall means includes a cover wall located to cover an intermediate portion of the width of the port opening at the trailing part leaving early opening regions at the opposite sides of the cover wall.

3. A rotary piston engine in accordance with claim 1 in which said port opening is of a substantially rectangular configuration having rounded corners, and said wall means includes a cover wall located to cover an intermediate portion of the width of the port opening at the trailing part leaving early opening regions at the opposite sides of the cover wall.

4. A rotary piston engine in accordance with claim 3 in which said hollow body of said insert means is located in said exhaust port with a clearance therebetween and means is provided for preventing exahust gas from flowing through the clearance.

5. A rotary piston engine in accordance with claim 4 in which said hollow body is offset further from the inner wall of the rotor housing than the wall means and the partition means.

6. A rotary piston engine in accordance with claim 3 in which said partition means includes first partition wall means extending in the peripheral direction of the rotor housing from the cover wall and continuous to second partition wall means extending in the axial direction of the rotor housing.

7. A rotary piston engine including a casing comprised of a rotor housing having an inner wall of a trochoidal configuration and a pair of side housing gastightly secured to the opposite sides of the rotor housing to form a rotor cavity therein, a substantially polygonal rotor disposed in said casing with apex portions in sliding contact with the inner wall of the rotor housing to define working chambers of which volumes cyclically change to conduct intake, compression, expansion and exhaust strokes as the rotor rotates, intake port means provided in said casing to open to the working chamber in the intake stroke, exhaust port means provided in the rotor housing and including a single exhaust port which is opened to the working chamber in the exhaust stroke through a port opening formed in the inner wall of the rotor housing, said port opening having a width in axial direction of the rotor housing and a length in peripheral direction of the rotor housing, said exhaust port having a depth from said port opening in an outward direction of the rotor housing, insert means in said exhaust port, said insert means having a hollow body located in said exhaust port with a clearance therebetween, a cover wall having opposite side edges and located to cover an intermediate portion of the width of the port opening at the trailing part leaving early opening regions at the opposite sides of the cover wall and a pair of partition walls extending from said side edges of the cover wall in the peripheral direction of the rotor housing and in depthwise direction of the exhaust port into the hollow body to separate at least partially the early opening regions from remaining region.

8. A rotary piston engine in accordance with claim 7 in which said insert means further includes a second partition wall continuous with ends of the first mentioned partition walls and extending in widthwise direction of the port opening.

9. A rotary piston engine in accordance with claim 8 in which said second partition wall extends substantially throughout the width of the port opening.

10. A rotary piston engine in accordance with claim 7 in which said insert means further includes a second partition wall extending in a widthwise direction outwardly from a leading side end of each of the first mentioned partition walls.

* * * * *